(12) United States Patent
Tian

(10) Patent No.: US 10,597,018 B2
(45) Date of Patent: Mar. 24, 2020

(54) PNEUMATIC SHIP AND PNEUMATIC SHIP SYSTEM

(71) Applicant: Xiang Tian, Jiangsu (CN)

(72) Inventor: Xiang Tian, Jiangsu (CN)

( * ) Notice: Subject to any disclaimer, the term of this patent is extended or adjusted under 35 U.S.C. 154(b) by 0 days.

(21) Appl. No.: 15/890,977

(22) Filed: Feb. 7, 2018

(65) Prior Publication Data

US 2018/0162345 A1 Jun. 14, 2018

(30) Foreign Application Priority Data

Dec. 4, 2017 (CN) .......................... 2017 1 1259491

(51) Int. Cl.
| | | |
|---|---|---|
| B63H 11/00 | (2006.01) | |
| B60V 1/11 | (2006.01) | |
| B60V 1/14 | (2006.01) | |
| B60V 1/18 | (2006.01) | |
| B60V 3/06 | (2006.01) | |
| B63H 11/12 | (2006.01) | |
| B63B 7/08 | (2020.01) | |
| B63B 35/00 | (2020.01) | |

(52) U.S. Cl.
CPC .................. B60V 1/11 (2013.01); B60V 1/14 (2013.01); B60V 1/18 (2013.01); B60V 3/06 (2013.01); B63B 7/08 (2013.01); B63H 11/12 (2013.01); B63B 2035/007 (2013.01)

(58) Field of Classification Search
CPC .... B60V 1/11; B60V 1/14; B60V 1/18; B60V 3/06; B63H 7/00; B63H 7/02
USPC .................... 440/37, 38, 40, 44, 47
See application file for complete search history.

(56) References Cited

U.S. PATENT DOCUMENTS

| | | | | |
|---|---|---|---|---|
| 3,198,274 A | * | 8/1965 | Cocksedge | B60V 1/043 114/67 A |
| 3,259,097 A | * | 7/1966 | Veldhuizen | B60V 1/14 114/67 A |
| 3,762,355 A | * | 10/1973 | Raynes | B60V 1/08 114/273 |
| 4,407,215 A | * | 10/1983 | Cyr | B63B 1/38 114/271 |
| 5,025,745 A | * | 6/1991 | Wine | B63B 1/38 114/289 |
| 5,082,465 A | * | 1/1992 | Wine | B63H 7/02 416/189 |
| 5,158,033 A | * | 10/1992 | Evans | B60V 1/14 114/289 |
| 5,357,894 A | * | 10/1994 | Jacobson | B60V 1/22 114/272 |
| 5,526,764 A | * | 6/1996 | Jacobson | B60V 1/22 114/272 |
| 5,626,669 A | * | 5/1997 | Burg | B60V 1/046 114/273 |
| 5,711,494 A | * | 1/1998 | Saiz | B60V 1/22 114/283 |
| 6,148,757 A | * | 11/2000 | Schulte | B63B 1/20 114/288 |

(Continued)

Primary Examiner — Daniel V Venne

(57) ABSTRACT

A pneumatic boat is provided. The pneumatic boat includes a floating body which is suitable for floating on a water surface and a pneumatic propulsion device arranged on the floating body, wherein the pneumatic propulsion device is suitable for forming airflow to generate a propulsive force, so as to push the floating body to move. Technical solutions of the present invention have a higher flexibility.

11 Claims, 10 Drawing Sheets

(56) References Cited

U.S. PATENT DOCUMENTS

| | | | | |
|---|---|---|---|---|
| 6,450,111 B1* | 9/2002 | Cocksedge | ............... | B60V 1/14 |
| | | | | 114/67 A |
| 7,090,549 B2* | 8/2006 | Garcia | .................... | B63H 7/02 |
| | | | | 114/61.1 |
| 2010/0167602 A1* | 7/2010 | Vu | ........................... | B63H 7/02 |
| | | | | 440/6 |
| 2011/0053438 A1* | 3/2011 | Robicheaux | ............. | B63H 7/02 |
| | | | | 440/37 |
| 2013/0189883 A1* | 7/2013 | Miller | ...................... | B63H 7/00 |
| | | | | 440/12.5 |
| 2013/0295800 A1* | 11/2013 | McDermott | ............. | B63H 7/02 |
| | | | | 440/37 |
| 2017/0203824 A1* | 7/2017 | Tan | ........................... | B63B 1/18 |
| 2018/0222466 A1* | 8/2018 | Noroyan | .................... | B63B 1/38 |

\* cited by examiner

PNEUMATIC SHIP AND PNEUMATIC SHIP SYSTEM

CROSS REFERENCE OF RELATED APPLICATION

The application claims priority under 35 U. S. C. 119(a-d) to CN 201711259491.1, filed Dec. 4, 2017.

BACKGROUND OF THE PRESENT INVENTION

Field of Invention

The present invention relates to a field of boat, and more particularly to a pneumatic boat.

Description of Related Arts

Generally, the pneumatic boat with the power provided by the air jet needs to cooperate with the air cushion formed below the boat, thereby decreasing the resistance between the boat and the water surface. The above pneumatic boat is also called the hovercraft. The hovercraft is often applied in the field of transportation, requiring a relatively large propulsive force, and the flexibility thereof needs to be improved.

SUMMARY OF THE PRESENT INVENTION

A technical problem solved by the present invention is to increase a flexibility of a pneumatic boat.

In order to solve the above problem, the present invention provides a pneumatic boat, comprising a floating body which is suitable for floating on a water surface and a pneumatic propulsion device arranged on the floating body, wherein the pneumatic propulsion device is suitable for forming airflow to generate a propulsive force, so as to push the floating body to move.

Preferably, the pneumatic propulsion device comprises a pneumatic propeller connected to a tail part of the floating body, wherein a jet direction of the pneumatic propeller is a direction of a fore part of the floating body pointing to the tail part of the floating body.

Preferably, the pneumatic propulsion device further comprises a sensing mechanism arranged on the floating body, wherein the sensing mechanism comprises at least one sensor which is suitable for generating a sensing signal according to a sensed action of a user; and the pneumatic propulsion device further comprises a controller which is suitable for receiving the sensing signal and generating a control signal according to the sensing signal, so as to control at least one of a jet direction and a jet volume per unit time of the pneumatic propulsion device.

Preferably, the sensing mechanism further comprises: a connection rod with a first end connected with the floating body; and a holding part connected with a second end of the connection rod.

Preferably, the holding part comprises a left holding part and a right holding part, wherein both of the left holding part and the right holding part are connected to the connection rod; the number of the sensors is at least two; and the sensors are respectively arranged at the left holding part and the right holding part, so as to respectively measure pressures withstood by the left holding part and the right holding part.

Preferably, the holding part comprises a left holding part and a right holding part, wherein both of the left holding part and the right holding part are connected to the connection rod; a connection surface is a section where the left holding part and the connection rod are connected; a normal direction of the connection surface is obliquely connected with the connection rod; and the sensor is arranged at the connection surface.

Preferably, the sensor is arranged between the connection rod and the floating body, so as to measure a pressure or a torque between the connection rod and the floating body.

Preferably, the floating body comprises a fore part, a middle part and a tail part which are successively connected, wherein: a width of the fore part of the floating body narrows along a direction of the middle part pointing to the fore part; and the tail part of the floating body is arc-shaped.

Preferably, the pneumatic propulsion device comprises a first pneumatic propulsive unit, wherein: the first pneumatic propulsive unit comprises at least one pneumatic propeller; and the controller is suitable for controlling a jet direction and a jet volume per unit time of the first pneumatic propulsive unit.

Preferably, the connection rod and the first pneumatic propulsive unit are arranged at the fore part of the floating body; the pneumatic propulsion device further comprises a second pneumatic propulsive unit; the second pneumatic propulsive unit comprises at least one pneumatic propeller; the second pneumatic propulsive unit is fixedly arranged at the tail part of the floating body; a jet direction of the second pneumatic propulsive unit is a direction of the middle part of the floating body pointing to the tail part of the floating body; and the controller is suitable for controlling the jet direction of the second pneumatic propulsive unit.

Preferably, the pneumatic boat further comprises a plurality of jet mechanisms arranged at an edge of the floating body, wherein the jet mechanisms are suitable for jetting towards the water surface.

Preferably, a thickness of the edge of the floating body is smaller than a thickness of a center of the floating body; and a lower surface of the floating body protrudes towards the water surface.

Preferably, the pneumatic boat further comprises a cutting mechanism, wherein: the cutting mechanism is stretchable and arranged on the floating body; and, when the cutting mechanism is in a condition of stretching out, a cutting direction thereof is able to be changed.

Preferably, the floating body is a surfboard.

Compared with the prior art, the technical solutions of the present invention have following beneficial effects.

According to the present invention, the pneumatic boat comprises the floating body and the pneumatic propulsion device arranged on the floating body, wherein: the floating body is suitable for floating on the water surface and has a relatively small self-weight; and, through arranging the pneumatic propulsion device on the floating body, the airflow is directly formed to generate the propulsive force, so as to push the pneumatic boat. Through pushing the pneumatic boat by the airflow, the debris in the water is prevented from entering the pneumatic boat and an influence of the water flow direction is also avoided. Therefore, with the above pneumatic boat, the actions of steering and moving become more flexible, the cost is relatively low, and the reliability is relatively high. The pneumatic boat provided by the present invention can be used for the daily recreation.

Furthermore, through the sensing mechanism arranged on the floating body, the user operation is sensed and the sensing signal is generated; and through the controller which controls the pneumatic propulsion device according to the sensing signal, the user can conveniently operate the floating body, thereby improving the user experience.

Furthermore, through arranging the pneumatic propeller with the changeable jet direction at the fore part of the floating body and arranging the pneumatic propeller having the jet direction consistent with the direction of the middle part pointing to the tail part fixedly at the tail part of the floating body, it is merely required to adjust the pneumatic propeller arranged at the fore part of the floating body when changing the direction, so as to improve the stability of the pneumatic boat when changing the direction.

Furthermore, the thickness of the edge of the floating body is smaller than the thickness of the center of the floating center; the lower surface of the floating body protrudes towards the water surface; the pneumatic boat further comprises the plurality of jet mechanisms arranged at the edge of the floating body; and the jet mechanisms are suitable for jetting towards the water surface. When the jet mechanisms jet towards the water surface, the pressure between the pneumatic boat and the water surface is decreased, so that the resistance during the sailing process is decreased and the pneumatic boat can be applied in various environments such as in the water and marsh.

Furthermore, the cutting mechanism is arranged and able to cut the foreign matter such as the water plant which stops the movement of the pneumatic boat, so that the sailing reliability of the pneumatic boat is increased.

Furthermore, when the floating body serves as the surfboard, the pneumatic propeller is arranged on the surfboard. When surfing with the pneumatic boat provided by the present invention, the requirements on the natural conditions of the surfboard are decreased; and, when the sea wave is relatively small, the pneumatic propeller can be used for accelerating, so as to improve the surfing experience of the user.

DETAILED DESCRIPTION OF THE PREFERRED EMBODIMENT

As described above, a boat generally cooperates with an air cushion formed below the boat, so as to decrease a resistance of a water surface and increase a sailing speed. The above pneumatic boat is also called the hovercraft, which is often applied in a field of transportation.

The above hovercraft has a relatively large volume and power consumption, and a relatively poor control flexibility and energy-saving performance, so that an application range thereof is limited.

In another technical solution of a boat having a relatively high flexibility, in order to obtain a relatively large propulsive force, a propeller driven by a motor is arranged below the water surface, and meanwhile a water inlet and a water outlet are arranged. The propulsive force is generated by a water flow from the water inlet to the water outlet through a rotation of the propeller. The above technical solution requires the propeller to form the flow, so that foreign matter in water is easily attached to the propeller, which has a relatively poor reliability.

According to the preferred embodiments of the present invention, a pneumatic boat is provided, comprising a floating body and a pneumatic propulsion device arranged on the floating body, wherein: the floating body is suitable for floating on the water surface and has a relatively small self-weight; and, the pneumatic propulsion device is arranged on the floating body and directly generates the propulsive force through forming airflow, so as to push the pneumatic boat. Through pushing the pneumatic boat by the airflow, debris in the water is prevented from entering the pneumatic boat and an influence of a water flow direction is also avoided. Therefore, with the above pneumatic boat, actions of steering and moving become more flexible, and a cost is relatively low. Moreover, because an air outlet of the pneumatic propulsion device is located above a waterline, the debris in the water is prevented from entering the pneumatic boat, so that the pneumatic boat has a relatively high reliability.

With a social development, differentiated demands of different social groups become more and more. The pneumatic boat provided by the present invention can be used for daily recreation, and can also be applied in fields of unmanned rescue, unmanned detection, unmanned delivery and scientific investigation, which has a relatively wide application range.

In order to make objects, features and beneficial effects of the present invention more apparent and understandable, the preferred embodiments of the present invention are described in detail with the accompanying drawings as follows.

First Preferred Embodiment

Figure 1:
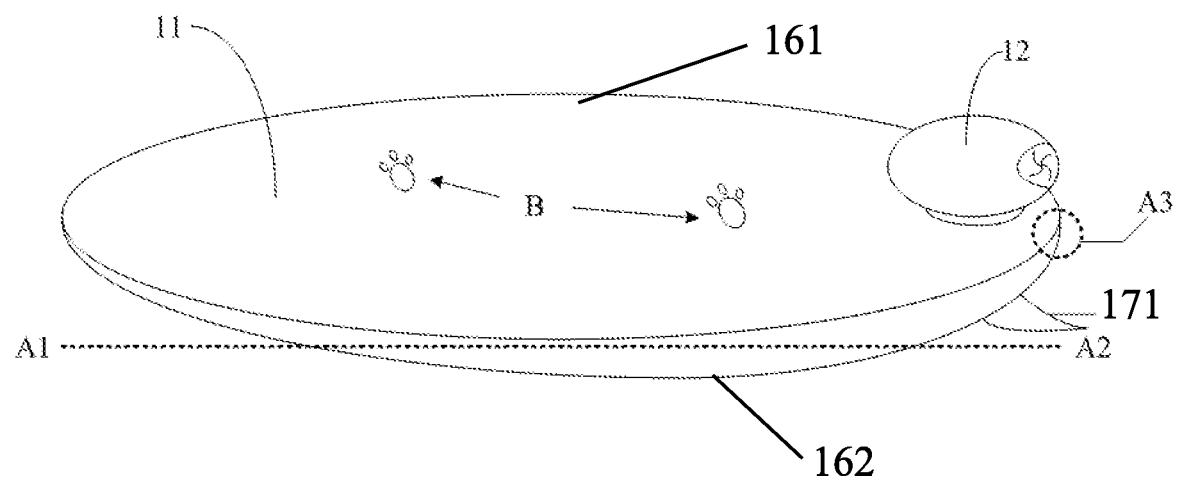
FIG. 1 is a structural sketch view of a pneumatic boat according to a first preferred embodiment of the present invention.

FIG. 1 is a structural sketch view of a pneumatic boat according to the first preferred embodiment of the present invention. Referring to FIG. 1, the pneumatic boat comprises a floating body 11 and a pneumatic propulsion device, wherein the pneumatic propulsion device comprises at least one pneumatic propeller.

According to the first preferred embodiment of the present invention, the pneumatic propulsion device is embodied as a pneumatic propeller 12.

The floating body 11 is suitable for floating on a water surface. The floating body can be embodied as a surfboard. A user can stand, kneel or lie on an upper surface 161 of the floating body 11, namely a surface where a pattern "B" shown in FIG. 1 is located, for surfing. A tail fin 171 is arranged at a lower surface 162 of the floating body 11, so as to increase a stability of the pneumatic boat.

In other embodiments of the present invention, the floating body can be the surfboard of other shapes. One skilled in the art can understand that: all of the floating bodies that can be used for surfing belong to the surfboard, such as an inflatable rubber cushion, a rowboat and a kayak. However, an application range of the pneumatic boat provided by the first preferred embodiment is not limited to surfing.

A length of the floating body is limited to six meters, and a width thereof is limited to two meters.

According to the first preferred embodiment of the present invention, a density of the floating body can be smaller than a density of water; and materials of the floating body can be selected from polyurethane, synthetic resin, fiberglass, reinforced plastic and carbon fiber material.

The pneumatic propeller 12 is arranged on the floating body 11, and an air outlet of the pneumatic propeller 12 is arranged above a waterline "A1-A2" of the pneumatic boat shown in FIG. 1, so as to generate a propulsive force and push the floating body to move.

Furthermore, the pneumatic propeller 12 is connected to a tail part of the floating body 11; a jet direction of the pneumatic propeller 12 is a direction of a fore part of the floating body 11 pointing to the tail part of the floating body; and the jet direction of the pneumatic propeller 12 can be invariant with respect to the floating body 11.

With the above pneumatic boat, the user can change an attitude of the floating body through adjusting an own body posture, so as to adjust a sailing direction of the pneumatic boat. The operations are same or similar as operations adopted by the user when surfing. When surfing with the above pneumatic boat, it is relatively easy for the user who can surf expertly with a conventional surfboard to master operative skills.

Moreover, when surfing with the pneumatic boat provided by the first preferred embodiment, because of a propulsion effect of the pneumatic propeller of the pneumatic boat, requirements on natural conditions of the surfboard are decreased. When a sea wave is relatively small, the pneumatic propeller can be utilized for accelerating, so as to improve a surfing experience of the user.

One skilled in the art can understand that: the pneumatic propeller 12 is exemplary only; a specific structure and shape of the pneumatic propeller can be different from that shown in FIG. 1; the pneumatic propeller provided by the present invention can be selected from various pneumatic propellers in prior art. The pneumatic propeller can be electric or driven by a gas turbine.

Moreover, the pneumatic propeller can also be a jet propeller, a compressed air system with a fan or other types of propellers that can form the airflow to provide the propulsive force. Correspondingly, the air outlet of the pneumatic propeller can be an air jet outlet or an air outlet of the fan in the compressed air system. The above various pneumatic propellers generate the propulsive force through forming the airflow. For description convenience, in the present invention, the various ways for generating the airflow are all called jet, and jet is not the limitation of the specific way for generating the airflow.

In other embodiments of the present invention, the air outlet of the pneumatic propeller can also be located at a position of "A3" shown in FIG. 1 or other positions above the waterline of the floating body. Correspondingly, the pneumatic propeller can also be contained inside the floating body.

The number of the pneumatic propeller matches with a size and a weight of the floating body, so that the pneumatic propeller becomes suitable for generating the propulsive force to push the floating body to move.

Although FIG. 1 shows the first preferred embodiment with merely one pneumatic propeller as the pneumatic propulsion device, in the specific application, the pneumatic propulsion device can comprise a plurality of pneumatic propellers. The pneumatic propeller can also be arranged at the middle part or the fore part of the floating body.

Moreover, although the jet direction of the pneumatic propeller 12 shown in FIG. 1 is invariant with respect to the floating body 11, in the specific application, the pneumatic propulsion device can comprise a pneumatic propeller having a changeable jet direction with respect to the floating body. The pneumatic propeller with the changeable jet direction belongs to a first pneumatic propulsive unit.

That is to say, in the specific application, the pneumatic boat comprises the floating body and the pneumatic propulsion device, wherein: the pneumatic propulsion device comprises at least one pneumatic propeller; whether each pneumatic propeller belongs to the first pneumatic propulsive unit or a second pneumatic propulsive unit is determined by whether the jet direction of the pneumatic propeller can change with respect to the floating body. The pneumatic propulsion device comprises at least one of the first pneumatic propulsive unit and the second pneumatic propulsive unit.

Specifically, the first pneumatic propulsive unit comprise at least one pneumatic propeller, wherein: the jet direction of each pneumatic propeller in the first pneumatic propulsive unit is adjustable with respect to the floating body; and the jet directions of every pneumatic propeller in the first pneumatic propulsive unit can be the same or not. A jet volume per unit time of each pneumatic propeller in the first pneumatic propulsive unit is also adjustable.

The pneumatic propulsion device can merely comprise the second pneumatic propulsive unit, wherein merely a jet volume per unit time of the second pneumatic propulsive unit can be changed; and the second pneumatic propulsive unit comprises at least one pneumatic propeller. For example, as shown in FIG. 1, the pneumatic propulsion device of the pneumatic boat merely comprises the second pneumatic propulsive unit, and the second pneumatic propulsive unit merely comprises the pneumatic propeller 12.

The pneumatic propulsion device can merely comprise the first pneumatic propulsive unit or the second pneumatic propulsive unit (as shown in FIG. 1). It is also feasible than the pneumatic propulsion device comprises both of the first pneumatic propulsive unit and the second pneumatic propulsive unit. The above pneumatic propulsion devices have different application scenes and beneficial effects, and are respectively described as follows.

When the pneumatic propulsion device merely comprises the first pneumatic propulsive unit, a jet volume per unit time and a jet direction with respect to the floating body of each pneumatic propeller of the pneumatic boat are adjustable, so that the pneumatic boat has a better flexibility and controllability.

When the pneumatic propulsion device merely comprises the second pneumatic propulsive unit, a control of the pneumatic boat depends on body movements of the user, a cost is relatively low and requirements of the surfing user are well met.

When the pneumatic propulsion device comprises the first pneumatic propulsive unit and the second pneumatic propulsive unit, a stability of the pneumatic boat is increased and part of the cost is decreased.

In conclusion, the pneumatic propulsion device can be arranged according to the application scene and is not limited herein.

A control of the pneumatic propulsion device is illustrated in detail as follows.

Figure 2:
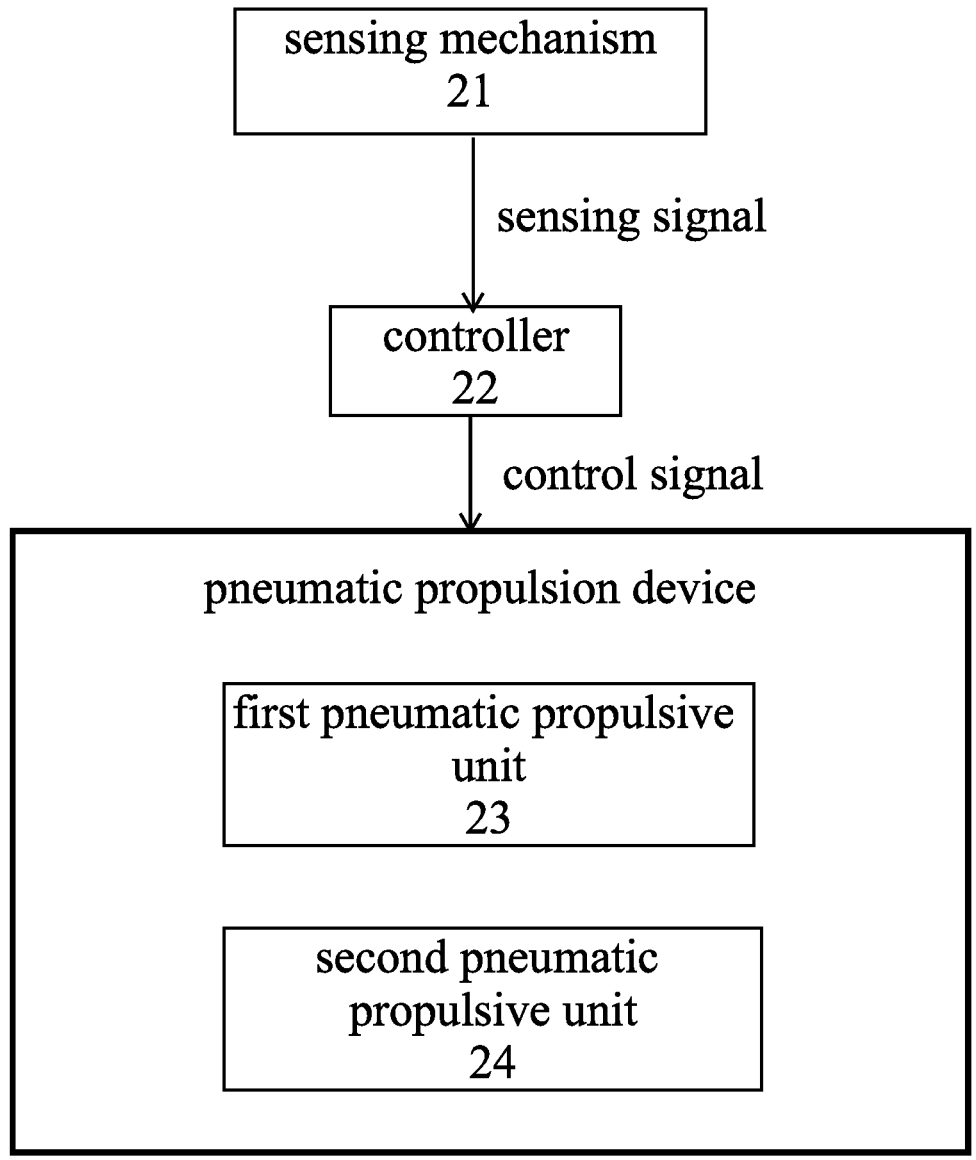
FIG. 2 is a structural sketch view of a control system of the pneumatic boat according to the first preferred embodiment of the present invention.

As shown in FIG. 2, the pneumatic boat further comprises a sensing mechanism 21 and a controller 22, wherein the sensing mechanism 21 senses an action of the user and generates a sensing signal according to the user action; and, the controller 22 is suitable for generating a control signal according to the sensing signal, so as to control the pneumatic propulsion device.

The pneumatic propulsion device comprises at least one of the first pneumatic propulsive unit 23 and the second pneumatic propulsive unit 24. The jet direction and the jet volume per unit time of the first pneumatic propulsive unit 23 can be both controlled by the controller 22; and, the jet volume per unit time of the second pneumatic propulsive unit 24 can also be controlled by the controller 22.

The sensing mechanism 21 can be arranged at the floating body. The sensing mechanism 21 comprises at least one sensor which is suitable for generating the sensing signal according to the sensed user action. The sensor can be a pressure sensor, a torque sensor or an image sensor. The sensor can also be the other sensing device that can sense the user action and generate the sensing signal.

The controller 22 is suitable for receiving the sensing signal and generating the control signal according to the sensing signal, so as to control at least one of the jet direction and the jet volume per unit time of the first pneumatic propulsive unit 23. It is also feasible that the controller generates the control signal according to the sensing signal, so as to control the jet volume per unit time of the second pneumatic propulsive unit 24.

A control of the controller 22 on the second pneumatic propulsive unit 24 can refer to a control of the controller on the first pneumatic propulsive unit 23. The control of the controller 22 on the first pneumatic propulsive unit 23 is illustrated as follows.

In the specific application, a specific shape and structure of the sensing mechanism 21 and a configuration of the sensor are various and further described as follows.

Besides the sensor, the sensing mechanism can further comprise: a connection rod with a first end connected with the floating body; and a holding part connected with a second end of the connection rod. At the moment, a position and a type of the sensor have various choices and are illustrated as follows.

Figure 3:
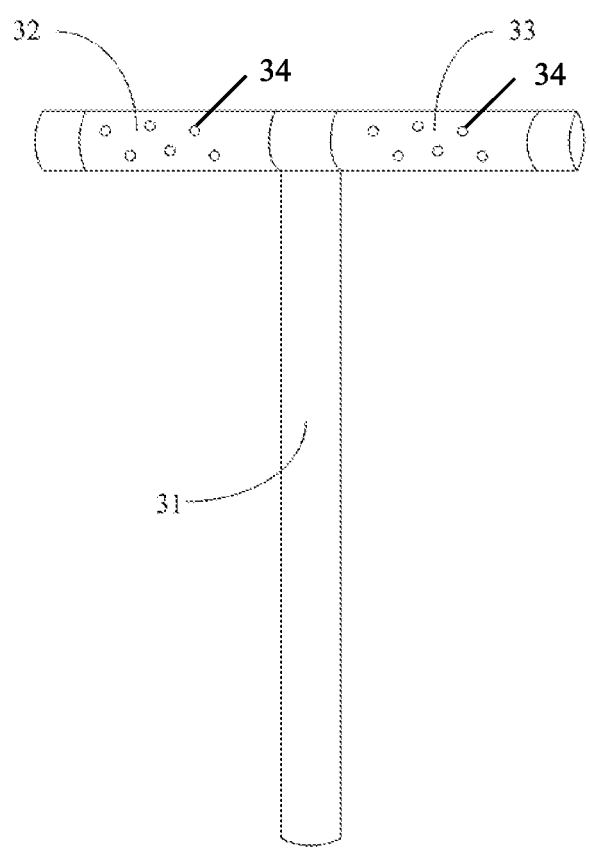
FIG. 3 is a structural sketch view of a first sensing mechanism according to the first preferred embodiment of the present invention.

FIG. 3 is a structural sketch view of a first sensing mechanism according to the first preferred embodiment of the present invention. The sensing mechanism comprises a connection rod 31, a left holding part 32 and a right holding part 33 which are connected to the connection rod 31, and sensors 34 respectively arranged at the left holding part 32 and the right holding part 33.

Figure 4:
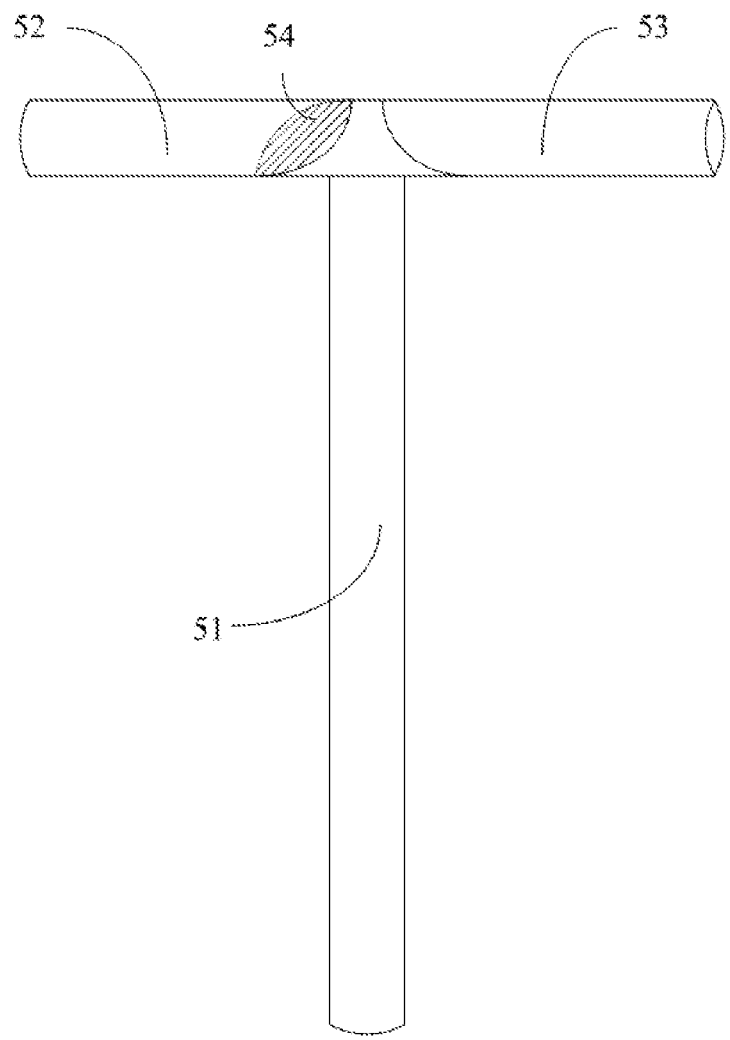
FIG. 4 is a structural sketch view of a second sensing mechanism according to the first preferred embodiment of the present invention.

FIG. 4 shows a structural sketch view of a second sensing mechanism. The sensing mechanism comprises a connection rod 51 and a holding part, wherein the holding part comprises a left holding part 52 and a right holding part 53; both of the left holding part 52 and the right holding part 53 are connected to the connection rod 51.

A connection surface 54 is a section where the left holding part 52 and the connection rod 51 are connected. A normal direction of the connection surface 54 is obliquely connected with the connection rod. The sensor is arranged at the connection surface 54. Because the normal direction of the connection surface 54 is obliquely connected with the connection rod, a direction of the pressure measured by the sensor arranged at the connection surface 54 can reflect a force direction of the sensing mechanism more comprehensively, so as to sense the user action more accurately.

Figure 5:
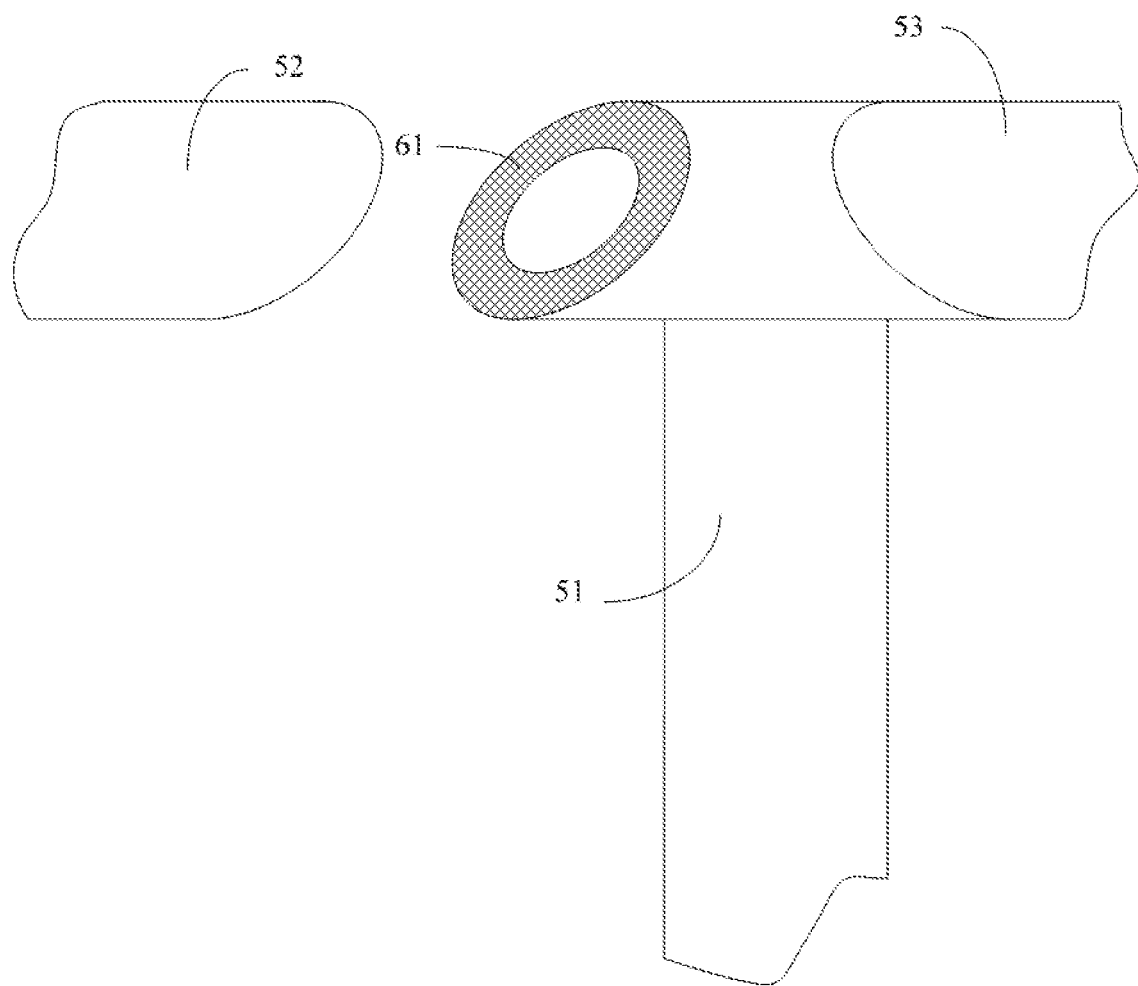
FIG. 5 is a structural sketch view of a connection surface between a left holding part and a connection rod shown in FIG. 4.

FIG. 5 is a structural sketch view of the connection surface between the left holding part and the connection rod shown in FIG. 4.

Furthermore, the sensor arranged at the connection surface can be an annular flake sensor arranged at an area 61 shown in FIG. 5. Alternatively, a plurality of sensors are arranged at the area 61, so as to measure the pressure between the left holding part 52 and the connection rod 51.

The connection rod and the holding part of the sensing mechanism can be integrated together or connected in other ways, such as welding and clamping.

In the specific application, the sensors of the sensing mechanism measure the pressures withstood by the left holding part and the right holding part. After obtaining the sensing signal, the controller controls the first pneumatic propulsive unit according to the sensing signal.

For example, when a resultant force of the pressures withstood by the left and right holding parts comprises a leftward component, the controller can control all or part of the pneumatic propellers in the first pneumatic propulsive unit to jet towards left rear; conversely, the controller can control all or part of the pneumatic propellers in the first pneumatic propulsive unit to jet towards right rear.

The controller can also control the jet volume per unit time of the first pneumatic propulsive unit according to the sensing signal. For example, when the measured resultant force of the pressures withstood by the left and right holding parts is forward, the controller increases the jet volume per unit time; when the measured resultant force is backward, the controller decreases the jet volume per unit time.

The controller is able to judge according to specific values of the pressures withstood by the left and right holding parts, so as to adjust the jet direction and the jet volume of the first pneumatic propulsive unit more accurately. For example, when the measured resultant force of the pressures withstood by the left and right holding parts is backward and larger than a preset value, the controller can decrease the jet volume per unit time of the first pneumatic propulsive unit; when the jet volume per unit time is decreased to zero, the controller can control the first pneumatic propulsive unit to jet forward, until the user implements the subsequent operation.

When the first pneumatic propulsive unit comprises a plurality of pneumatic propellers, the controller can respectively control the plurality of pneumatic propellers according to the sensing signal and configuration positions of the plurality of pneumatic propellers.

The control of the controller on the first pneumatic propulsive unit has various ways. Besides the above-described examples, the control signal can be obtained through other ways of calculating a value and a direction of the pressure measured by each sensor, and then the controller controls the first pneumatic propulsive unit according to the control signal.

The holding part of the sensing mechanism can also be spherical (referring to FIG. 6) or disc-shaped (referring to FIG. 7) and is described as follows.

Figure 6:
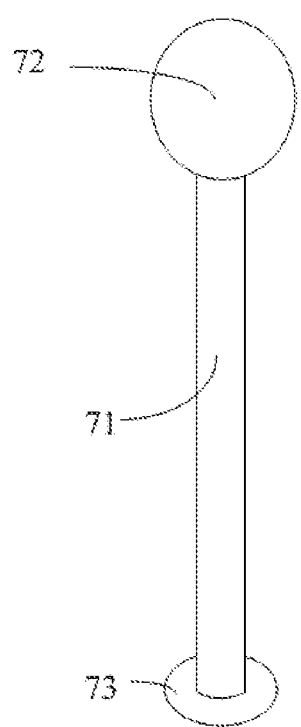
FIG. 6 is a structural sketch view of a third sensing mechanism according to the first preferred embodiment of the present invention.

In FIG. 6, the sensing mechanism comprises a connection rod 71, a holding part 72 and a sensor, wherein the sensor is arranged between the connection rod 71 and the floating body, such as in an area 73, so as to measure a pressure between the connection rod and the floating body.

The sensor obtains the sensing signal through the pressure between the connection rod 71 and the floating body; and, the controller generates the control signal according to a value and a direction of the pressure and controls the pneumatic propulsion device according to the control signal.

Figure 7:
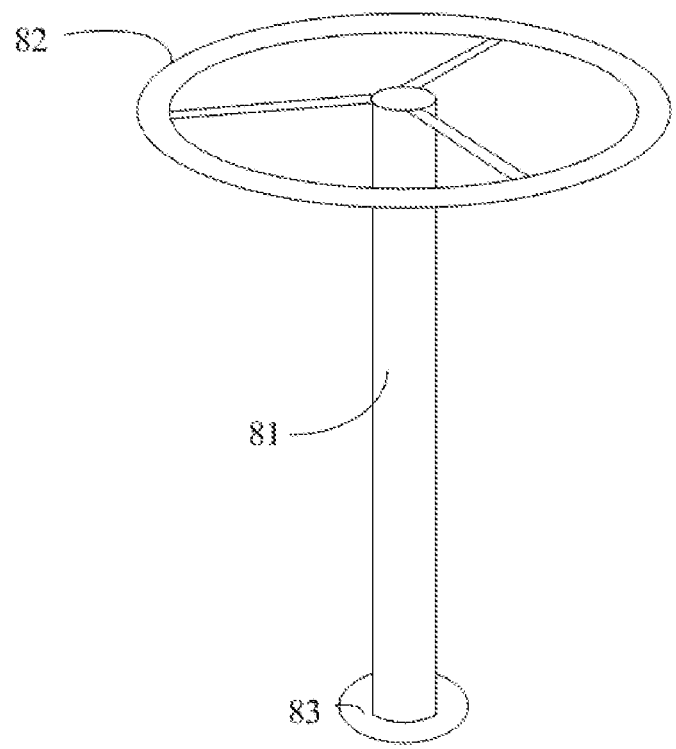
FIG. 7 is a structural sketch view of a fourth sensing mechanism according to the first preferred embodiment of the present invention.

In FIG. 7, the sensing mechanism comprises a connection rod 81, a holding part 82 and a sensor, wherein the sensor is arranged between the connection rod 81 and the floating body, such as in an area 83, so as to measure a torque between the connection rod and the floating body.

The sensor generates the sensing signal according to the torque between the connection rod 81 and the floating body; and, the controller generates the control signal according to a value and a direction of the torque, so as to realize the control of the pneumatic propulsion device.

In other embodiments of the present invention, a button can be arranged at the holding part or the connection rod; through pressing the button, the user determines a sailing direction and a sailing speed.

Second Preferred Embodiment

Figure 8:
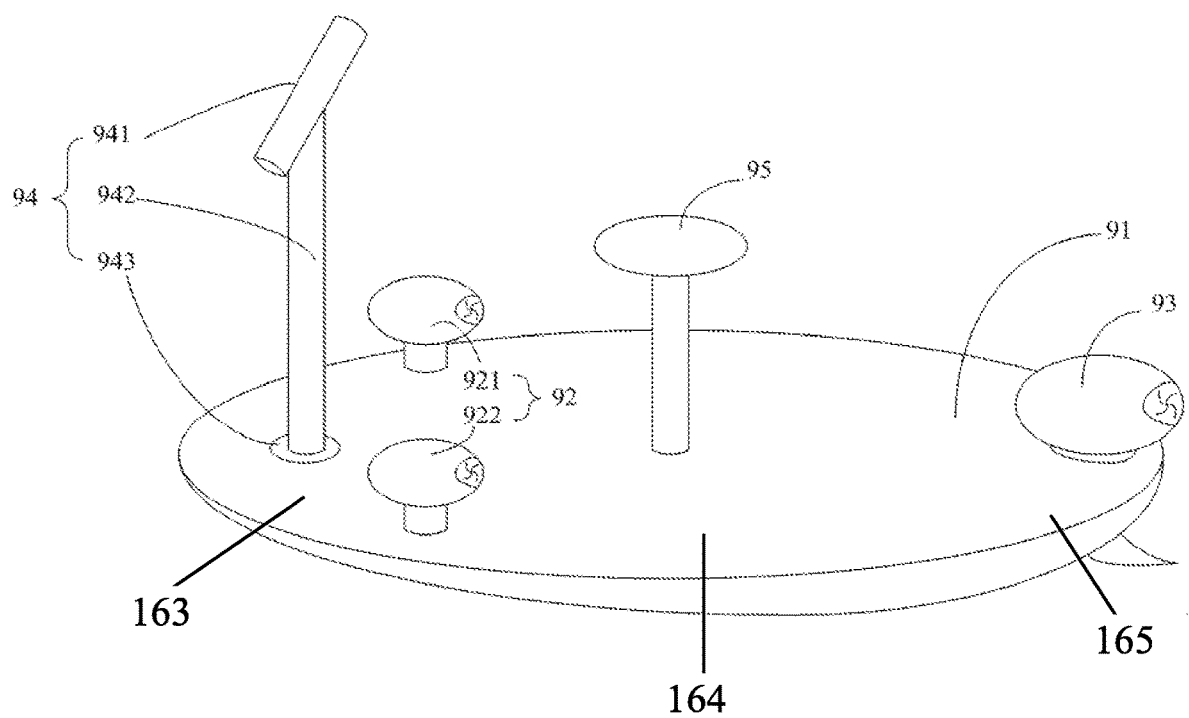
FIG. 8 is a structural sketch view of a pneumatic boat according to a second preferred embodiment of the present invention.

FIG. 8 shows a structural sketch view of a pneumatic boat according to the second preferred embodiment of the present invention.

As shown in FIG. 8, the pneumatic boat comprises a floating body 91, a first pneumatic propulsive unit 92, a second pneumatic propulsive unit, a sensing mechanism 94 and a controller (not shown in FIG. 8), wherein the second pneumatic propulsive unit comprises a pneumatic propeller 93.

The floating body 91 comprises a fore part 163, a middle part 164 and a tail part 165 which are successively connected, wherein: a width of the fore part of the floating body narrows along a direction of the middle part 164 pointing to the fore part 163; and the tail part 165 of the floating body is arc-shaped.

The first pneumatic propulsive unit 92 comprises a first pneumatic propeller 921 and a second pneumatic propeller 922. The second pneumatic propulsive unit merely comprises the pneumatic propeller 93. The first pneumatic propulsive unit is arranged at the fore part of the floating body, and the second pneumatic propulsive unit is arranged at the tail part of the floating body.

The first pneumatic propeller 921 and the second pneumatic propeller 922 are connected to the floating body 91 through rotation shafts. The controller changes jet directions of the first pneumatic propeller 921 and the second pneumatic propeller 922 through driving the rotation shafts.

The sensing mechanism 94 comprises a holding part 941, a connection rod 942 and a sensor 943, wherein: the connection rod 942 is arranged at the fore part of the floating body; the connection rod 942 is integrated with the holding part 941; the sensor 943 is suitable for measuring a pressure between the connection rod 942 and the floating body 91 and generating a sensing signal according to a value and a direction of the pressure.

The controller is able to generate a control signal according to the sensing signal, so as to control the first pneumatic propulsive unit 92 and the second pneumatic propulsive unit.

The user can stand on an upper surface of the floating body 91 and holds the holding part 941 by one or two hands. When the pneumatic boat need accelerating, the user forward pushes the holding part 941; when the pneumatic boat need decelerating, the user backward pulls the holding part 941; and, when the pneumatic boat need steering, the user exerts a pressure to the holding part 941 in a specific direction.

Different user actions can be presented by the pressure between the connection rod 942 and the floating body 91, which is measured by the sensor 943. Then the sensing signal is generated according to the value and the direction of the pressure.

The controller generates the control signal according to the sensing signal generated by the sensor 943, so as to control the pneumatic propulsion device.

For example, when the sensing signal presents the pressure direction towards the front-left, the controller can control the second pneumatic propulsive unit to increase the jet volume per unit time according to a value of a forward pressure component, control the second pneumatic propeller 922 and the first pneumatic propeller 921 of the first pneumatic propulsive unit to steer and jet towards the right rear, and meanwhile adjust the jet volume per unit time of the second pneumatic propeller 922 and the first pneumatic propeller 921 according to a value of a leftward pressure component. During the above process, the controller can also adjust the jet volume per unit time of the pneumatic propeller 93 of the second pneumatic propulsive unit.

For description convenience, a direction of the tail part of the floating body pointing to the fore part of the floating body is a forward direction and is taken as a standard to determine a backward direction, a leftward direction and a rightward direction.

The jet volume per unit time of the second pneumatic propulsive unit can be smaller than that of the first pneumatic propulsive unit, so as to change the sailing direction of the pneumatic boat more stably.

According to the second preferred embodiment, the pneumatic boat further comprises a seat 95, and the user can sit on the seat 95 and control the pneumatic boat.

One skilled in the art can understand that each part shown in FIG. 8 is exemplary only and not for limiting the shape, size and relative size relation of each part.

In other embodiments of the present invention, it is feasible that: the connection rod and the holding part are not arranged; the sensor is arranged at the upper surface of the floating body, so as to measure a gravity center change of the user on the floating body and generate the sensing signal; the upper surface of the floating body is a surface of the floating body deviating from the water surface.

For example, the user can control the pneumatic boat with a relatively small movement range, and the actions of the user are similar as actions when controlling the conventional surfboard. The user who is accustomed to the conventional surfboard is able to faster master the pneumatic boat provided by the present invention, and an experience of the user is improved.

Third Preferred Embodiment

Figure 9:
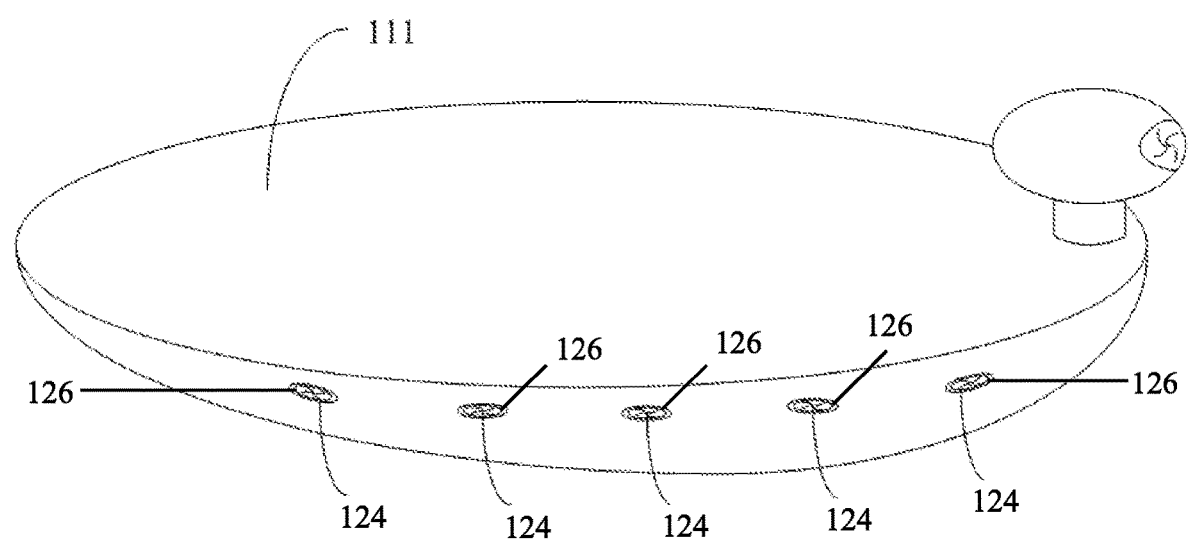
FIG. 9 is a structural sketch view of a first pneumatic boat according to a third preferred embodiment of the present invention.

FIG. 9 is a structural sketch view of a first pneumatic boat according to the third preferred embodiment, comprising a floating body 111 and a plurality of jet mechanisms 124 arranged at an edge of the floating body, wherein each jet mechanism 124 comprises a fan 126.

A control of the jet mechanisms 124 is mainly illustrated as follows. The pneumatic boat can further comprise other parts such as a controller and a pneumatic propulsion device. Detailed control ways of the parts can refer to the above description and are not repeated again.

A thickness of the edge of the floating body 111 is smaller than a thickness of a center of the floating body 111; and a lower surface of the floating body 111 protrudes towards a water surface.

The plurality of jet mechanisms 124 which are arranged at the edge of the floating body are suitable for jetting towards the water surface, so as to decrease a resistance between the pneumatic boat and the water surface.

According to the third preferred embodiment of the present invention, the pneumatic boat can sail in water areas of rivers, lakes and seas, sail in marsh, and sail in a water surface covered by water plants or other plants.

Through arranging the jet mechanisms 124, a pressure between the pneumatic boat and the water surface is decreased. Through changing a jet volume per unit time of the jet mechanisms 124, a lifting degree of the pneumatic boat is controlled. The pneumatic boat provided by the third preferred embodiment can also sail with a bottom surface of the floating body completely away from the water surface.

The pneumatic boat further comprises a cutting mechanism, wherein: the cutting mechanism is stretchable and arranged on the floating body; and, when the cutting mechanism is in a condition of stretching out, a cutting direction thereof is able to be changed. Therefore, when the pneumatic boat sails in a complex environment and meets an abnormal condition, such as being winded by the water plants, the pneumatic boat can be out of the abnormal condition actively, so that a sailing reliability of the pneumatic boat is improved.

Figure 10:
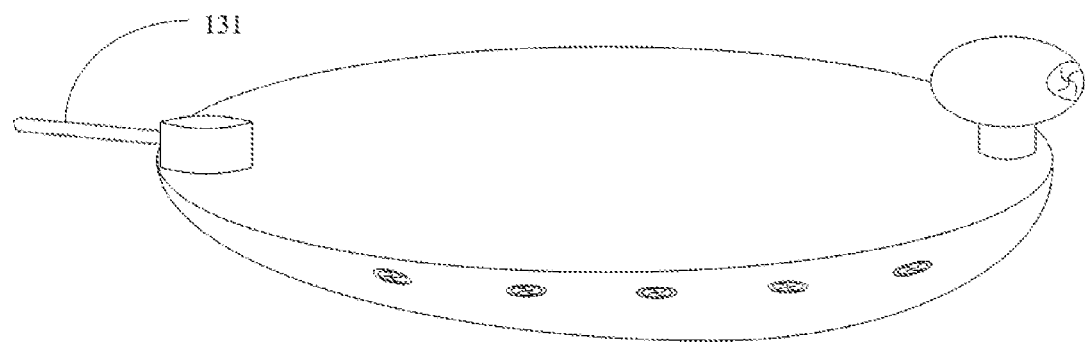
FIG. 10 is a structural sketch view of a second pneumatic boat according to the third preferred embodiment of the present invention.
Figure 11:
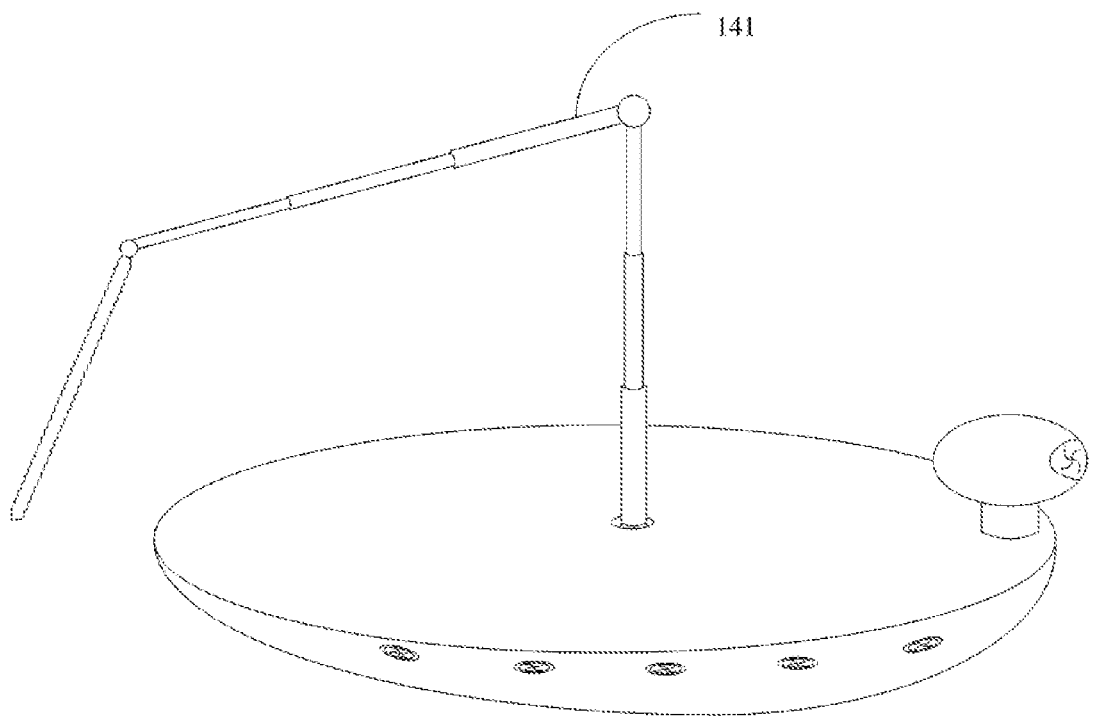
FIG. 11 is a structural sketch view of a third pneumatic boat according to the third preferred embodiment of the present invention.

The cutting mechanism has various shapes and structures, such as a cutting mechanism 131 in FIG. 10 and a cutting mechanism 141 in FIG. 11.

The cutting mechanism can be electric, and the controller is able to control the cutting direction and a cutting force of the cutting mechanism.

The controllers in different preferred embodiments can be the same. It is also feasible that the controllers in the different preferred embodiments are different and independent with each other. The controller is arranged according to the particular condition.

The pneumatic boat with the jet mechanisms has the wider sailing range; and, the equipment, such as the scientific investigation equipment and the detection equipment, is able to be arranged on the pneumatic boat, for the unmanned scientific investigation and detection.

According to the preferred embodiments of the present invention, the pneumatic boat comprises the floating body and the pneumatic propulsion device arranged on the floating body; a density of the floating body is smaller than a density of water, and the floating has a relatively small self-weight; the pneumatic propulsion device is arranged at a position above the waterline of the pneumatic boat and able to directly jet to push the pneumatic boat; actions of the pneumatic boat such as steering and moving become more flexible, and the pneumatic boat has a relatively low cost. Therefore, the pneumatic boat has the wider application range and can be applied in fields of daily recreation, unmanned rescue, unmanned delivery, unmanned detection and scientific investigation.

When being applied in different fields, different parts can be arranged on the pneumatic boat, such as the lift buoy, storage rack and detector.

The present invention is not limited to the above disclosure. One skilled in the art is able to make various changes and modifications without departing from the spirit and scope of the present invention. Therefore, the protection range of the present invention is limited by the following claims.

What is claimed is:

1. A pneumatic boat, comprising:
a floating body, which is suitable for floating on a water surface;
a pneumatic propulsion device arranged on the floating body, which is suitable for forming airflow to generate a propulsive force, so as to push the floating body to move;
a sensing mechanism arranged on the floating body, comprising at least one sensor which is suitable for generating a sensing signal according to a sensed action of a user; and
a controller, which is suitable for receiving the sensing signal and generating a control signal according to the sensing signal, so as to control at least one of a jet direction and a jet volume per unit time of the pneumatic propulsion device; and
the pneumatic boat further comprises a plurality of jet mechanisms arranged at an edge of the floating body, wherein: each jet mechanism comprises a fan; the jet mechanisms are suitable for jetting towards the water surface; a thickness of the edge of the floating body is smaller than a thickness of a center of the floating body; and a lower surface of the floating body protrudes towards the water surface.

2. The pneumatic boat, as recited in claim 1, wherein: the pneumatic propulsion device comprises a pneumatic propeller connected to a tail part of the floating body; and, a jet direction of the pneumatic propeller is a direction of a fore part of the floating body pointing to the tail part of the floating body.

3. The pneumatic boat, as recited in claim 1, wherein the sensing mechanism further comprises:
a connection rod with a first end connected with the floating body; and
a holding part connected with a second end of the connection rod.

4. The pneumatic boat, as recited in claim 3, wherein: the holding part comprises a left holding part and a right holding part; both of the left holding part and the right holding part are connected to the connection rod; an amount of the sensors is at least two; and the sensors are respectively arranged at the left holding part and the right holding part, so as to respectively measure pressures withstood by the left holding part and the right holding part.

5. The pneumatic boat, as recited in claim 3, wherein: the holding part comprises a left holding part and a right holding part; both of the left holding part and the right holding part are connected to the connection rod; a connection surface is a section where the left holding part and the connection rod are connected; a normal direction of the connection surface is obliquely connected with the connection rod; and the sensor is arranged at the connection surface.

6. The pneumatic boat, as recited in claim 3, wherein the sensor is arranged between the connection rod and the floating body, so as to measure a pressure or a torque between the connection rod and the floating body.

7. The pneumatic boat, as recited in claim 3, wherein: the floating body comprises a fore part, a middle part and a tail part which are successively connected; a width of the fore part of the floating body narrows along a direction of the middle part pointing to the fore part; and the tail part of the floating body is arc-shaped.

8. The pneumatic boat, as recited in claim 7, wherein: the pneumatic propulsion device comprises a first pneumatic propulsive unit; the first pneumatic propulsive unit comprises at least one pneumatic propeller; and the controller is suitable for controlling a jet direction and a jet volume per unit time of the first pneumatic propulsive unit.

9. The pneumatic boat, as recited in claim 8, wherein: the connection rod and the first pneumatic propulsive unit are arranged at the fore part of the floating body; the pneumatic propulsion device further comprises a second pneumatic propulsive unit; the second pneumatic propulsive unit comprises at least one pneumatic propeller; the second pneumatic propulsive unit is fixedly arranged at the tail part of the floating body; a jet direction of the second pneumatic propulsive unit is a direction of the middle part of the floating body pointing to the tail part of the floating body; and the controller is suitable for controlling the jet direction of the second pneumatic propulsive unit.

10. The pneumatic boat, as recited in claim 1, further comprising a cutting mechanism, wherein: the cutting mechanism is stretchable and arranged on the floating body; and, when the cutting mechanism is in a condition of stretching out, a cutting direction of the cutting mechanism is able to be changed.

11. The pneumatic boat, as recited in claim 1, wherein: a tail fin is arranged at the lower surface of the floating body, so as to increase a stability of the pneumatic boat.

* * * * *